United States Patent
Yu

(10) Patent No.: US 7,561,953 B2
(45) Date of Patent: Jul. 14, 2009

(54) METHOD AND SYSTEM OF CONTROLLING A VEHICLE IN THE PRESENCE OF A DISTURBANCE

(75) Inventor: Jingsheng Yu, Northville, MI (US)

(73) Assignee: Robert Bosch GmbH (DE)

( * ) Notice: Subject to any disclaimer, the term of this patent is extended or adjusted under 35 U.S.C. 154(b) by 827 days.

(21) Appl. No.: 11/079,619

(22) Filed: Mar. 14, 2005

(65) Prior Publication Data
US 2006/0206253 A1 Sep. 14, 2006

(51) Int. Cl.
G05D 13/00 (2006.01)
G05D 1/08 (2006.01)

(52) U.S. Cl. ............................ 701/78; 701/70; 701/71; 280/400; 73/117.01

(58) Field of Classification Search ................. 701/36, 701/37, 38, 39, 40, 51, 70, 71, 76, 77, 78, 701/79, 124; 280/5.5, 5.501, 5.502, 5.507, 280/455.1, 400; 303/123; 340/440; 477/97; 180/271, 282; 73/117.01

See application file for complete search history.

(56) References Cited

U.S. PATENT DOCUMENTS

| | | |
|---|---|---|
| 3,908,782 A | 9/1975 | Lang et al. |
| 4,023,863 A | 5/1977 | Sisson et al. |
| 4,023,864 A | 5/1977 | Lang et al. |
| 4,034,822 A | 7/1977 | Stedman |
| 4,232,910 A | 11/1980 | Snyder |
| 4,275,898 A | 6/1981 | Muste Llambrich |
| 4,697,817 A | 10/1987 | Jefferson |
| 4,706,984 A | 11/1987 | Esler et al. |
| 4,850,249 A | 7/1989 | Kirstein |
| 5,011,170 A | 4/1991 | Forbes et al. |
| 5,139,374 A | 8/1992 | Holt et al. |
| 5,333,940 A | 8/1994 | Topfer |
| 5,348,331 A | 9/1994 | Hawkins |
| 5,380,072 A | 1/1995 | Breen |

(Continued)

FOREIGN PATENT DOCUMENTS

EP 1477338 A2 11/2004

(Continued)

OTHER PUBLICATIONS

H.E. Tseng, B. Ashrafi, D. Madau, T.A. Brown, and D. Recker, "The Development of Vehicle Stabiliity Control at Ford," IEEE/ASME Transactions on Mechatronics, vol. 4, No. 3, Sep., pp. 223, 1999 (whole document).*

(Continued)

Primary Examiner—Thomas G Black
Assistant Examiner—Peter D Nolan
(74) Attorney, Agent, or Firm—Michael Best & Friedrich LLP

(57) ABSTRACT

A system and method of controlling a towing vehicle adapted to be connected to a trailer at a hitch. The method includes sensing a plurality of vehicle conditions indicative of at least a movement of the towing vehicle, and an angle of the towing vehicle, determining a disturbance at the hitch based on data including at least the movement of the vehicle and the angle of the vehicle, and generating a compensation signal based on the determined disturbance at the hitch.

39 Claims, 3 Drawing Sheets

U.S. PATENT DOCUMENTS

| | | | |
|---|---|---|---|
| 5,707,071 | A | 1/1998 | Prestidge et al. |
| 5,747,683 | A * | 5/1998 | Gerum et al. ............ 73/117.01 |
| 5,861,802 | A | 1/1999 | Hungerink et al. |
| 5,964,819 | A * | 10/1999 | Naito .......................... 701/72 |
| 6,223,114 | B1 | 4/2001 | Boros et al. |
| 6,272,407 | B1 | 8/2001 | Scholl |
| 6,311,111 | B1 | 10/2001 | Leimbach et al. |
| 6,324,447 | B1 | 11/2001 | Schramm et al. |
| 6,349,247 | B1 | 2/2002 | Schramm et al. |
| 6,438,464 | B1 | 8/2002 | Woywod et al. |
| 6,446,998 | B1 | 9/2002 | Koenig et al. |
| 6,452,485 | B1 | 9/2002 | Schutt et al. |
| 6,466,028 | B1 | 10/2002 | Coppinger et al. |
| 6,494,281 | B1 | 12/2002 | Faye et al. |
| 6,501,376 | B2 | 12/2002 | Dieckmann et al. |
| 6,523,911 | B1 | 2/2003 | Rupp et al. |
| 6,553,284 | B2 | 4/2003 | Holst et al. |
| 6,600,974 | B1 | 7/2003 | Traechtler |
| 6,604,035 | B1 | 8/2003 | Wetzel et al. |
| 6,636,047 | B2 | 10/2003 | Hecker et al. |
| 6,655,710 | B2 | 12/2003 | Lindell et al. |
| 6,756,890 | B1 | 6/2004 | Leimbach et al. |
| 7,272,481 | B2 * | 9/2007 | Einig et al. ................... 701/70 |
| 2004/0246116 | A1 | 12/2004 | Polzin |
| 2005/0006946 | A1 | 1/2005 | Traechtler et al. |
| 2005/0065694 | A1 | 3/2005 | Nenninger |
| 2005/0125132 | A1 | 6/2005 | Stumpp et al. |
| 2005/0206229 | A1 | 9/2005 | Lu et al. |
| 2006/0125313 | A1 | 6/2006 | Gunne et al. |

FOREIGN PATENT DOCUMENTS

| | | | |
|---|---|---|---|
| GB | 2402453 A | | 8/2004 |

OTHER PUBLICATIONS

D. Karnopp, "Automobiles". New York, NY: Marcel Decker, 2004 (chapters 6, 11).*

SAE Technical Paper Series, Parametric Study on Vehicle-Trailer Dynamics for Stability Control; SAE International, Warrendale, PA; Copyright 2003.

* cited by examiner

METHOD AND SYSTEM OF CONTROLLING A VEHICLE IN THE PRESENCE OF A DISTURBANCE

BACKGROUND

Embodiments of the invention relate to a method and device for controlling a motor vehicle in the presence of disturbances such as those caused by a trailer or semi-trailer.

Stability is a concern for a vehicle towing a trailer, especially when the vehicle towing the trailer is traveling at high speed or making a turn. Since the trailer significantly affects the dynamics of the towing vehicle, many control systems use techniques to improve the stability of the towing vehicle especially when a trailer is present. For example, systems such as anti-lock braking systems ("ABS"), traction control systems ("TCS"), and vehicle dynamics control ("VDC") systems are configured to perform a variety of functions that impact the vehicle and the trailer in order to improve stability. Furthermore, the towing vehicle can better control its transmission if the presence of a trailer is known to a control unit in the vehicle.

When towing a trailer, vehicles generally need additional hardware including a hitch articulation angle sensor to detect the behavior of the trailer, and to activate the vehicle's brake or engine control in response to trailer activity. In some other cases, signals from an electronic stability program ("ESP") are used for a detection of trailer oscillation. Once a trailer oscillation has been detected, the brake or the engine control is applied. However, once the trailer oscillation has started, any application of brake or engine control may be too late to be effective. Furthermore, since these controls are based on a heuristic approach in which only a portion of the vehicle dynamics is considered (instead of specific trailer dynamics), brake and engine controls can be unreliable.

SUMMARY

Accordingly, there is a need for improved methods and systems for controlling a towing vehicle in the presence of a trailer. The following summary sets forth certain embodiments of such methods and systems. However, it does not set forth all such embodiments and should in no way be construed as limiting of any particular embodiment.

Generally, according to one embodiment of the invention, a hitch force is first estimated based on a vehicle dynamics model using parameters such as steering angle, yaw rate, vehicle speed, and lateral acceleration signals. These parameters are generally available within a vehicle control system such as an ESP system. Based on the estimated hitch force, a compensation system is then used to compensate a vehicle control based on the estimated hitch force.

In another form, the invention provides a method of controlling a towing vehicle. The method includes sensing at least a movement of the towing vehicle, and an angle of the towing vehicle. The method also includes determining a disturbance at the hitch based on data including at least the movement of the vehicle and the angle of the vehicle, and generating a compensation signal based on the determined disturbance at the hitch.

In another form, the invention provides a system for controlling a towing vehicle. The system includes a plurality of sensors to sense respective vehicle conditions including a movement and a speed of the towing vehicle. The system also includes an estimating module to receive the sensed conditions including the movement of the towing vehicle and the speed of the towing vehicle, and to estimate a disturbance at the hitch based on data including the sensed conditions. The system also includes a compensation module to receive the estimated disturbance from the estimating module, and to generate a compensation signal based on the estimated disturbance at the hitch.

In another form, the invention provides a method of controlling a towing vehicle. The method includes modeling a plurality of dynamics of the vehicle, and determining a disturbance from the modeled dynamics of the vehicle. The method also includes determining at least one of a wheel torque and a steering angle based on the determined disturbance at the hitch.

In another form, the invention provides a system for controlling a towing vehicle. The system includes a means for modeling a plurality of dynamics of the vehicle, and a means for determining a hitch force based at least in part on the modeled dynamics. The system includes a means for compensating at least one of a wheel torque and a steering angle based on the force at the hitch.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, the claims should not be limited to the specific examples or terminology or to any specific hardware or software implementation or combination of software or hardware.

Embodiments of the invention relate to a method and system for controlling a motor vehicle in the presence of a trailer or semi-trailer. In one embodiment, a hitch force is considered a disturbance to a model describing a plurality of towing vehicle dynamics. The hitch force is estimated based on the model.

In a specific embodiment, a first vehicle condition that indicates a movement of the vehicle is sensed. A second vehicle condition that indicates an angle of the vehicle is also sensed. A hitch force is then estimated from the movement and the angle of the vehicle.

Figure 1:
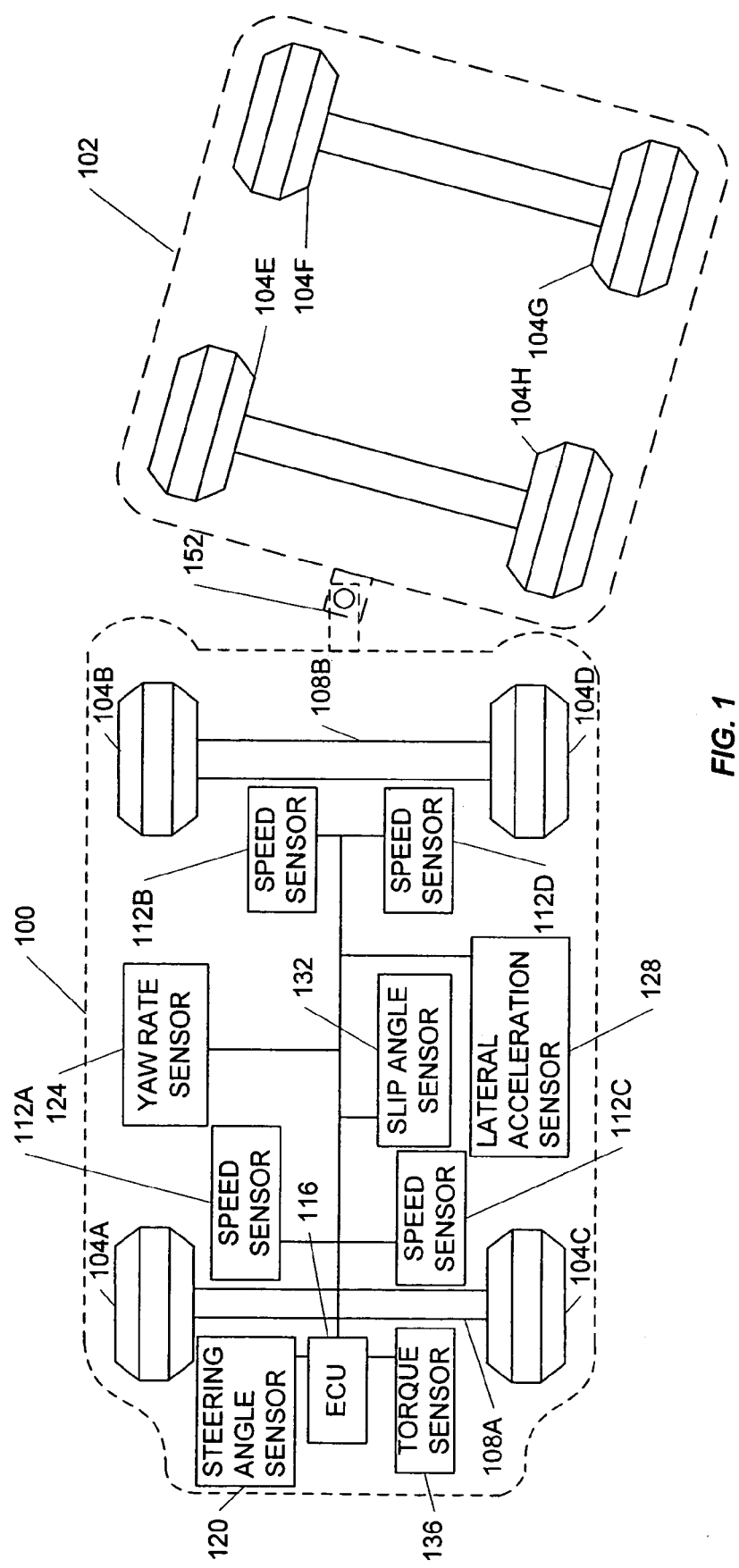
FIG. 1 shows a schematic plan view of a vehicle.

FIG. 1 shows a schematic plan view of a towing vehicle 100 towing a trailer 102. The towing vehicle 100 has four wheels 104A, 104B, 104C and 104D, and the trailer 102 has four wheels 104E, 104F, 104G and 104H. In some other embodiments, the vehicle 100 and the trailer 102 can have other numbers of wheels. Furthermore, the trailer 102 can be a semi-trailer, a full-size trailer, a boat trailer, a camper, or the like. The wheels 104A, 104B, 104C, and 104D are connected to two axles 108A and 108B, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116. The vehicle 100 also includes other sensors such as a steering angle sensor 120, a yaw rate sensor 124, and a lateral acceleration sensor 128. The wheel speed sensors 112A, 112B, 112C, and 112D, the steering sensor 120, the yaw rate sensor 124, and the lateral acceleration sensor 128 are shown as individual sensors generically. These sensors 112A, 112B, 112C, 112D, 120, 124, and 128 can also include multiple sensors in a plurality of sensor arrays, for example, that may be coupled to the ECU 116. Other sensor types such as body slip angle sensor 132, and an engine torque sensor 136 can also be used in the vehicle 100. The vehicle 100 also includes a hitch 152 coupled to the trailer 102.

In one embodiment, a compensation system 160 (FIG. 2) is embedded in the ECU 116 and used to generate signals to control compensating action in response to a disturbance or disturbing dynamic such as a force experienced at the hitch 152, detailed hereinafter. The compensation system 160 receives its input from a towing vehicle sensor array 168. In some embodiments, the towing vehicle sensor array 168 includes wheel speed sensors 112A, 112B, 112C, and 112D, the steering angle sensor 120, the yaw rate sensor 124, the lateral acceleration sensor 128, and the like. In other embodiments, the towing vehicle sensor array 168 can also include the body slip angle sensor 132.

In one embodiment, the towing vehicle sensor array 168 detects and monitors some specific conditions of the vehicle 100. For example, the sensors 112A, 112B, 112C, and 112D are used to sense a condition of the vehicle that is indicative of a movement or a speed of the towing vehicle 100. Sensed conditions are then transduced and converted into calibrated signals that are indicative of acceleration of the vehicle 100. If the sensors 112A, 112B, 112C, and 112D are equipped with any calibration circuitry or microprocessor therein, the speed can be converted internally to a calibrated form in the sensors 112A, 112B, 112C, and 112D. Otherwise, the conditions can be converted into calibrated signals by other external processes in a manner known in the art. Furthermore, other sensors such as the steering sensor 120, the yaw rate sensor 124, and the lateral acceleration sensor 128 are used to detect or sense events and movements, such as side-to-side movements, side-to-side acceleration of the towing vehicle, and angles of the movements. Collectively, values of the signals outputted by the sensors 112A, 112B, 112C, 112D, 120, 124, 128, or by the sensor array 168 are referred to as sensed values, or values, hereinafter. As a result, the ECU 116 and the compensation system 160 can use data from existing sensors available in a standard control system to control the motor vehicle in the presence of a trailer. In this way, additional hardware or sensors are unnecessary. Furthermore, since only data from the towing vehicle 100 needs to be used, data from the trailer is then also unnecessary.

Figure 2:
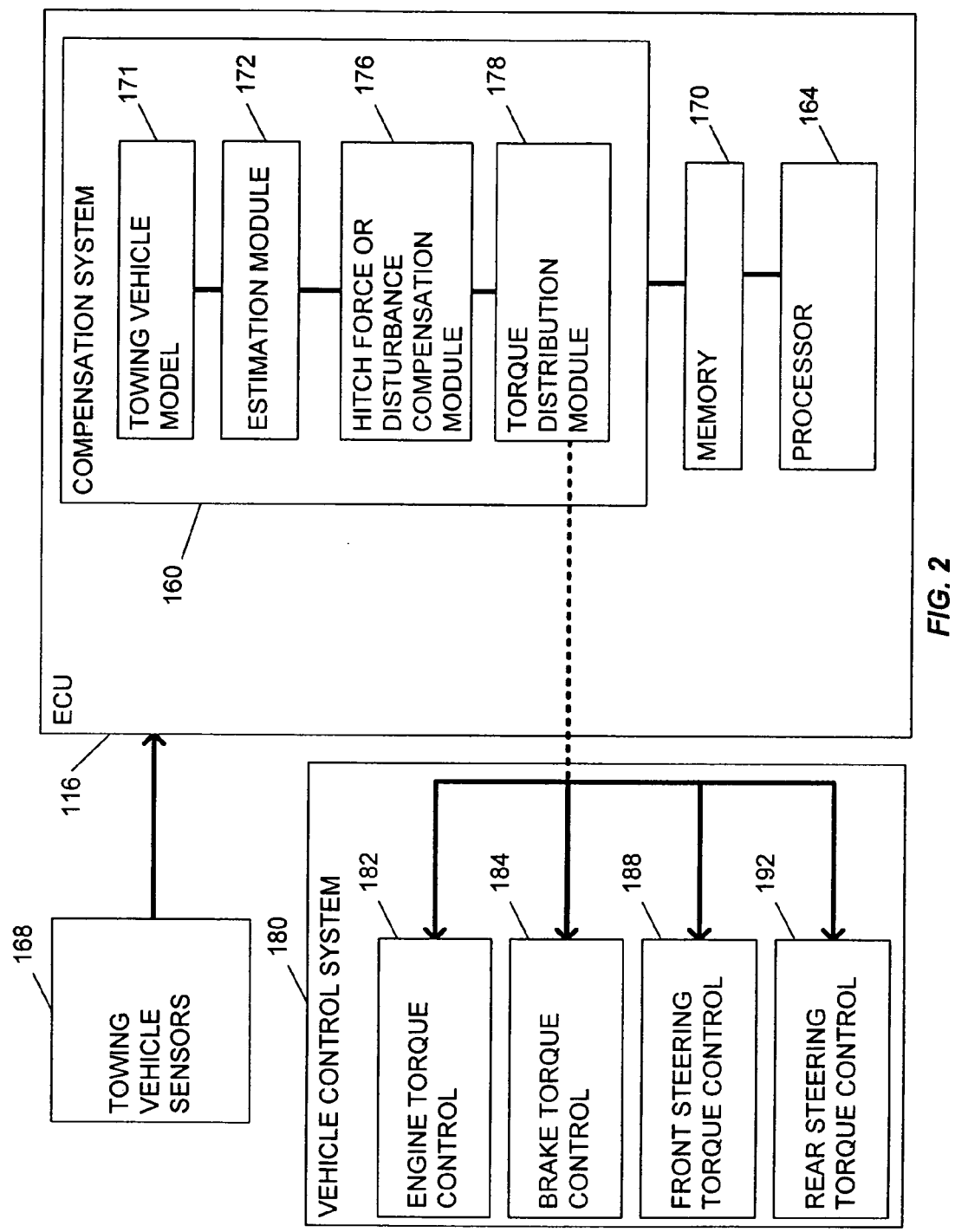
FIG. 2 shows a block diagram of a compensation system that can be applied in the vehicle of FIG. 1 according to one embodiment of the invention.

The ECU 116 includes a processor 164 that receives the values from the towing vehicle sensor array 168. The processor 164 then processes the values from the towing vehicle sensor array 168 according to a program stored in a memory 170. Although the memory 170 is shown as being external to the processor 164, the memory 170 can also be internal to the processor 164. Similarly, although the compensation system 160 is shown as being external to the processor 164, the compensation system 160 can also be internal to the processor 164, or integrated in other control systems of the vehicle 100. Furthermore, the processor 164 can be a general-purpose micro-controller, a general-purpose microprocessor, a dedicated microprocessor or controller, a signal processor, an application-specific-integrated circuit ("ASIC"), or the like. In some embodiments, the compensation system 160 and its functions described are implemented in a combination of firmware, software, hardware, and the like. To be more specific, as illustrated in FIG. 2, the processor 164 communicates with the compensation system 160 that is drawn assuming that these modules are implemented in hardware. However, the functionality of these modules can be implemented in software, and that software can, for example, be stored in the memory 170 and executed by the processor 164.

In the embodiment shown in FIG. 2, the compensation system 160 includes a towing vehicle model 171, an estimation module 172 and a disturbance compensation module 176. The towing vehicle model 171 formulates a plurality of vehicle dynamics from the parameters that can be obtained from the towing vehicle sensor array 168. In some embodiments, the vehicle dynamics include a steering angle ($\delta_f$), a yaw rate ($\dot{\psi}$), a lateral acceleration ($a_y$), a wheel speed (v), a front wheel torque ($T_f$) and a rear wheel torque ($T_r$), and the like. If the towing vehicle 100 (see FIG. 1) is hauling a trailer such as the trailer 102, the trailer 102 can exert a disturbance such as a hitch force ($F_{yh}$) on the towing vehicle 100. The compensation system 160 then uses the towing vehicle model 171, and the estimation module 172 to estimate a disturbance such as the hitch force or a hitch force estimate ($\hat{F}_{yh}$). This estimate may be based on some or all of the formulated vehicle dynamics from the towing vehicle model 171, such as the wheel torques and the steering angles, in a manner known in the art. The hitch force estimate ($\hat{F}_{yh}$) and some or all of the formulated vehicle dynamic parameters such as a front wheel torque ($T_f$) are subsequently used in the disturbance compensation module 176 to control the motor vehicle 100, as detailed hereinafter.

In one embodiment, the disturbance compensation module 176 generates a compensation factor or signal as an output to be received at a torque distribution module 178 that distributes the compensation factor or signal to different control modules that are part of a vehicle control system 180. In the embodiment shown in FIG. 2, the vehicle control system 180 includes an engine torque control 182 that controls an engine torque. The vehicle control system 180 also includes a brake torque control 184 that controls the application a brake, for example, by releasing a brake fluid that further applies pressure to a brake caliper, which applies a brake force. A front steering torque control 188 controls a front steering torque, and a rear steering torque control 192 controls a rear steering torque. In some embodiments, the disturbance compensation module 176 acts as a feedback to the vehicle control system 180. In some embodiments, the torque distribution module 178 is also a part of the vehicle control system 180. Although the compensation system 160 is shown as an external module to the vehicle control system 180, the compensation system 160 can also be internal to the vehicle control system 180. In the embodiment shown, the torque distribution module 178 receives the compensation factor or signal, and distributes the compensation signal to a combination of the control modules 182, 184, 188, 192 depending on the application at hand. Also, the ECU 116 can be a generic electronic control unit that includes a number of ECU's that perform other functions for the vehicle control system 180.

Figure 3:
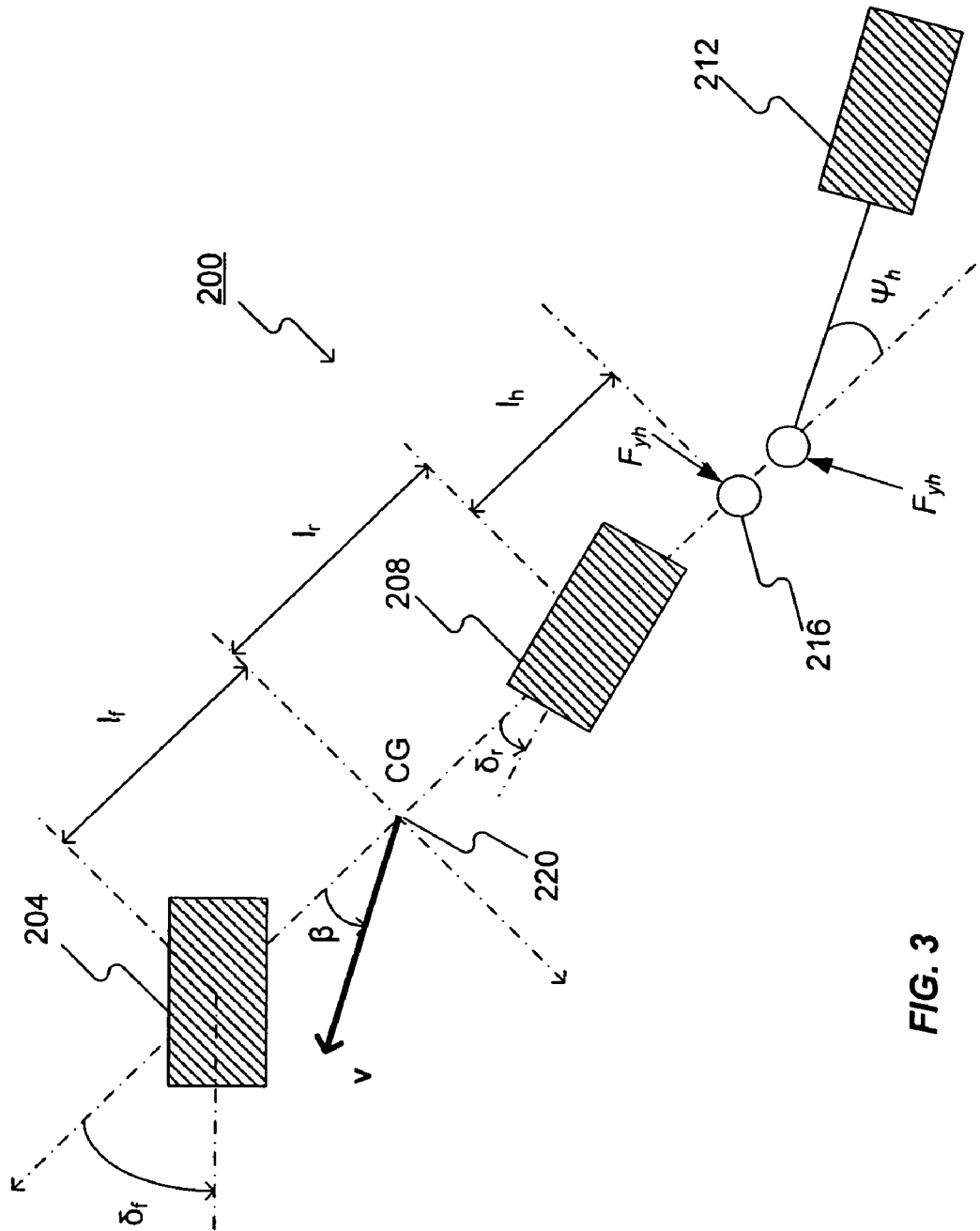
FIG. 3 shows a free-body diagram of a vehicle towing a trailer.

FIG. 3 shows an exemplary free-body diagram 200 of a vehicle towing a trailer that can be used as a model for the towing vehicle model 171. In the free-body diagram 200, the towing vehicle is represented by a combination of a front wheel 204 and a rear wheel 208, and the trailer is represented by a trailer wheel 212. The trailer is connected to the towing vehicle at a hitch 216. The hitch force ($F_{yh}$) is shown at the hitch 216 as an acting force as well as a reacting force. The free-body diagram 200 also shows that the towing vehicle is traveling with a wheel speed of v at a body slip angle of β, that is, the towing vehicle (represented by the front wheel 204 and the rear wheel 208) is turning at a front steering angle of $\delta_f$. In some vehicles, the towing vehicle can also turn with a back steering angle at $\delta_r$. The distances from a center of gravity ("CG") 220 of the towing vehicle to the front wheel 204 and to the rear wheel 208 are $l_f$ and $l_r$, respectively. The distance from the rear wheel 208 to the hitch 216 is $l_h$. The angle between the trailer wheel 212 and an axis joining the hitch 216 to the rear wheel 208 is a hitch articulation angle $\psi_h$. In this way, when the towing vehicle makes a turn or is subjected to a lateral force which generates nonzero readings from the towing vehicle sensor array 168, a lateral hitch force ($F_{yh}$) or the hitch force estimate ($\hat{F}_{yh}$) can be determined.

Using the exemplary free-body diagram 200 as shown in FIG. 3, a towing vehicle model (used for the towing vehicle model 171) can be set up. For example, the towing vehicle model can consider the hitch force ($\hat{F}_{yh}$) as an additional dynamic component applied to the towing vehicle 100. When this consideration or assumption is made, an exact or explicit description of the trailer dynamics is, in general, unnecessary to utilize the towing vehicle model. In other embodiments, all or a subset of the trailer dynamics can also be used in the towing vehicle model. In addition, since the parameters as shown in FIG. 3 are generally available in the towing vehicle as part of a stability control program via a plurality of sensor signals acquired around the towing vehicle, additional hardware is unnecessary. When the towing vehicle model has been established, the hitch force estimate ($\hat{F}_{yh}$) can be determined based on the dynamics including the yaw rate, the steering angle, the lateral acceleration, the body slip angle, and the vehicle speed of the towing vehicle using the sensor signals as follows.

In some embodiments, the towing vehicle dynamics are represented by a linear bicycle model as shown in EQN. 1:

$$\begin{pmatrix} \dot{\beta} \\ \ddot{\psi} \end{pmatrix} = \begin{pmatrix} -\frac{C_f + C_r}{Mv} & -1 - \frac{C_f l_f - C_r l_r}{Mv^2} \\ -\frac{C_f l_f - C_r l_r}{I_z} & -\frac{C_f l_f^2 + C_r l_r^2}{I_z v} \end{pmatrix} \begin{pmatrix} \beta \\ \dot{\psi} \end{pmatrix} + \begin{pmatrix} \frac{C_f}{Mv} \\ \frac{C_f l_f}{I_z} \end{pmatrix} \delta_f + \begin{pmatrix} \frac{1}{Mv} \\ -\frac{l_r + l_h}{I_z} \end{pmatrix} F_{yh} \quad (1)$$

wherein the variable β is a body slip angle, the variable $\dot{\psi}$ is a yaw rate, the steering angle $\delta_f$ is a system input, M is a mass of the vehicle, v is a longitudinal speed of the towing vehicle, the variable $I_z$ is the moment of inertia of the towing vehicle around CG 220, $C_f$, $C_r$ are cornering stiffness of front and rear tires, respectively, $l_f$ and $l_r$ are the distances from the front and rear axle or wheels 204, 208 to CG 220, and $l_h$ is the length from the rear axle or wheel to the hitch 216. In some other embodiments, other towing vehicle models such as a two-track model, non-linear bicycle model, single-track model and the like can also be applied.

In general, the vehicle speed (v) is calculated from the wheel speed sensor signals of all four wheels. Of course, the wheel speed signals from a different number of wheels can also be used depending on the particular application. Thereafter, assuming $\hat{\beta}$ and $\hat{\dot{\psi}}$ are estimates of the body slip angle β and the yaw rate $\dot{\psi}$, respectively, and measuring β and $\dot{\psi}$, the hitch force estimate ($\hat{F}_{yh}$) can be determined as shown in EQN. 2.

$$\hat{F}_{yh}(t) = \hat{F}_{yh}(t-1) + K_1(v)(\beta - \hat{\beta}) + K_2(v)(\dot{\psi} - \hat{\dot{\psi}}) \quad (2)$$

EQN. 2 shows that the hitch force estimate ($\hat{F}_{yh}$) at time t can be dependent on the hitch force estimate ($\hat{F}_{yh}$) at a previous time instant, a body slip angle β, a body slip angle estimate $\hat{\beta}$, a yaw rate $\dot{\psi}$, and a yaw rate estimate $\hat{\dot{\psi}}$. Particularly, in some embodiments, EQN. 2 also shows that when the body slip angle β is equal to the body slip angle estimate $\hat{\beta}$, and the yaw rate $\dot{\psi}$ is equal to the yaw rate estimate $\hat{\dot{\psi}}$, the hitch force estimate ($\hat{F}_{yh}$) converges into a specific value. The estimation of the hitch force ($F_{yh}$) can be considered accurate when the hitch force estimate ($\hat{F}_{yh}$) converges. In some embodiments, $\hat{\beta}$ and $\hat{\dot{\psi}}$ are given by EQN. 3 as follows.

$$\hat{\beta}(t) = \hat{\beta}(t-1) + K_3(v)\hat{\beta}(t-1) + K_4(v)\hat{\dot{\psi}} + K_9(v)(\beta - \hat{\beta}(t-1)) + K_{10}(v)(\dot{\psi} - \hat{\dot{\psi}}(t-1)) + K_5 \delta_f, \text{ and}$$

$$\hat{\dot{\psi}}(t) = \hat{\dot{\psi}}(t-1) + K_6(v)\hat{\beta}(t-1) + K_7(v)\hat{\dot{\psi}} + K_{11}(v)(\beta - \hat{\beta}(t-1)) + K_{12}(v)(\dot{\psi} - \hat{\dot{\psi}}(t-1)) + K_8 \delta_f \quad (3)$$

wherein $K_1(v)$, $K_2(v)$, $K_3(v)$, $K_4(v)$, $K_5(v)$, $K_6(v)$, $K_7(v)$, $K_8(v)$, $K_9(v)$, $K_{10}(v)$, $K_{11}(v)$, and $K_{12}(v)$ are coefficients. These coefficients can generally be derived from the dynamic model selected such as the model of EQN. 1, as detailed hereinafter.

Similar to EQN. 2, values of the body slip angle estimate $\hat{\beta}$, and the yaw rate estimate $\hat{\dot{\psi}}$ at time t depend on the values of the body slip angle estimate $\hat{\beta}$, and the yaw rate estimate $\hat{\dot{\psi}}$ at a previous time instant, respectively, among other things. Furthermore, the values of the body slip angle estimate $\hat{\beta}$, and the yaw rate $\dot{\psi}$ at time t are also dependent on the differences between the estimates and the values from the respective sensors or from the towing vehicle sensor array 168. In some embodiments, if only the yaw rate $\dot{\psi}$ from the yaw rate sensor 124 is available, $K_1(v)$ is set to 0. In some embodiments, if only the body slip angle β from the body slip angle sensor 132 is available, $K_2(v)$ is set to 0. In some embodiments, the body slip angle β can also be calculated from a lateral acceleration $a_y$ from the lateral acceleration sensor 128 by EQN. 4:

$$\hat{\beta} = \frac{a_y}{v} - \dot{\psi}. \quad (4)$$

Some exemplary values of $K_1(v)$, $K_2(v)$, $K_3(v)$, $K_4(v)$, $K_5(v)$, $K_6(v)$, $K_7(v)$, $K_8(v)$, $K_9(v)$, $K_{10}(v)$, $K_{11}(v)$, and $K_{12}(v)$ can be derived from EQN. 1 as follows.

$$\begin{aligned} K_1 &= K_9 = K_{11} = 0 \\ K_2 &= \frac{I_z M v}{-C_f(l_f + l_r + l_h) - C_r l_h} D \\ K_3 &= -\frac{C_f + C_r}{Mv}, \\ K_4 &= -1 - \frac{C_f l_f - C_r l_r}{Mv^2}, \\ K_5 &= \frac{1}{Mv} \\ K_6 &= -\frac{C_f l_f - C_r l_r}{I_z}, \\ K_7 &= -\frac{C_f l_f^2 + C_r l_r^2}{I_z v}, \\ K_8 &= \frac{l_f + l_h}{I_z} \\ K_{12} &= E + K_3 + K_7 \\ K_{10} &= \frac{K_3 K_{12} - K_8 K_2 - K_3 K_7 + K_4 K_6}{K_6} \end{aligned} \quad (5)$$

wherein D and E are adjustable parameters. In this case, only the yaw rate $\dot{\psi}$ is used as a feedback measurement. In some embodiments, the value of D ranges from about −8000 to about −4000, and the value of E ranges from about −100 to about −10. Once the values of the parameters are obtained from the respective sensors, the coefficients can be determined with EQN. 5. As a result, values of the body slip angle estimate $\hat{\beta}$, and the yaw rate estimate $\hat{\dot{\psi}}$ of EQN. 3 can be determined. Similarly, values of the hitch force estimate ($\hat{F}_{yh}$) can also be obtained from EQN. 2 when the towing vehicle is moving.

Once the disturbance such as the hitch force estimate ($\hat{F}_{yh}$) has been determined, the disturbance compensation module 176 generates a compensation factor based on some requirements of the vehicle control system 180. For example, the compensation factor can include a plurality of engine torque parameters or values, front steering torque parameters or values, rear steering torque parameters or values, and brake torque parameters or values determined based on the hitch force estimate ($\hat{F}_{yh}$). In some embodiments, the compensation factor or signal can include only the front steering torque parameters when the vehicle control system 180 is configured to control only the front steering. In some other embodiments, the vehicle control system 180 can be configured to control engine torque. As a result, the compensation factor can include some engine torque parameters. Still in some other embodiments, the vehicle control system 180 can be configured to control both the front steering torque and the engine torque. In such cases, the compensation factor includes both the front steering torque parameters and the engine torque parameters.

In some embodiments, the vehicle control system 180 controls the wheel torque, the compensation factor for the trailer dynamics for the front and the rear torques can be determined by EQN. 6 and EQN. 7, respectively, as follows.

$$\Delta T_f = C_1 \hat{F}_{yh} \quad (6)$$

$$\Delta T_r = C_2 \hat{F}_{yh} \quad (7)$$

wherein $\Delta T_f$ and $\Delta T_r$ are the front and the rear torque compensation factor or values, respectively, and $C_1$ and $C_2$ are respective selectable parameters based on the model selected such as the model expressed in EQN. 1. In some embodiments, these parameters also generally depend on known variables such as the distances from the front and rear axles or wheels 204, 208 to CG 220 ($l_f$ and $l_r$), the length from the rear axle or wheel to the hitch 216 ($l_h$), the front steering angle ($\delta_f$), and the back steering angle ($\delta_r$). In one embodiment, the front wheel torque compensation factor ($\Delta T_f$) and the rear wheel torque compensation factor ($\Delta T_r$) can be expressed as follows.

$$\Delta T_f = P_1 \frac{l_h}{l_f + l_r} \delta_f \hat{F}_{yh}, \text{ and} \quad (8)$$

$$\Delta T_r = P_2 \frac{l_f + l_r + l_k}{l_f + l_r} \delta_r \hat{F}_{yh}, \quad (9)$$

wherein $P_1$ and $P_2$ are selectable parameters determined in the torque distribution module 178, and have values ranging from about 0.0 to about 10.0 in some embodiments. The values of $P_1$ and $P_2$ can also be adjusted depending on a plurality of vehicle dynamics such as the yaw rate ($\dot{\psi}$) and the lateral acceleration ($a_y$). When $\Delta T_f$ is greater than zero, the torque distribution module 178 distributes the compensation factor to the engine torque control 182 such that the engine torque can be compensated or adjusted accordingly. When $\Delta T_f$ is less than zero, the torque distribution module 178 distributes the compensation factor to the brake torque control 184 such that the brake torque can be compensated or adjusted accordingly.

If the vehicle control system 180 controls the steering or the steering angles, the compensation factor for the trailer dynamics for the front and the rear steering angles can be determined by EQN. 10 and EQN. 11, respectively, as follows.

$$\Delta \delta_f = C_3 \hat{F}_{yh}, \text{ and} \quad (10)$$

$$\Delta \delta_r = C_4 \hat{F}_{yh}, \quad (11)$$

wherein $C_3$ and $C_4$ are selectable parameters based on the model selected such as the model expressed in EQN. 1. In some embodiments, these selectable parameters ($C_3$ and $C_4$) depend on known variables such as the distances from the front and rear axle or wheels 204, 208 to CG 220 ($l_f$ and $l_r$), the length from the rear axle or wheel to the hitch 216 ($l_h$), the front steering angle ($\delta_f$), and the cornering stiffness of the front and rear tires ($C_f$ and $C_r$). In one embodiment, the front steering angle compensation factor ($\Delta \delta_f$) and the rear steering angle compensation factor ($\Delta \delta_r$) can be expressed as follows.

$$\Delta \delta_f = P_3 \frac{l_h}{(l_f + l_r)C_f} \hat{F}_{yh}, \text{ and} \quad (12)$$

$$\Delta \delta_r = P_4 \frac{l_f + l_r + l_h}{(l_f + l_r)C_r} \hat{F}_{yh}, \quad (13)$$

wherein $C_f$ and $C_r$ are the cornering stiffness of the front and rear tires, respectively. The values of $P_3$ and $P_4$ can also be adjusted depending on a plurality of vehicle dynamics such as the yaw rate ($\dot{\psi}$) and the lateral acceleration ($a_y$), and will be determined in the torque distribution module 178. In some embodiments, the values of $P_3$ and $P_4$ can have values ranging from about 0.0 to about 1.0. Once the values of $\Delta \delta_f$ and $\Delta \delta_r$ have been determined, $\Delta \delta_f$ and $\Delta \delta_r$ are then fed to the front steering torque control 188 and the rear steering torque control 192, or to other parts of the vehicle control 180, to adjust the steering angles applied to the front and the rear wheels.

Various features and advantages of the invention are set forth in the following claims.

What is claimed is:

1. A method of controlling a towing vehicle adapted to be connected to a trailer, the method comprising:
    sensing a plurality of vehicle conditions indicative of at least a movement of the towing vehicle, and an angle of the towing vehicle;
    estimating a hitch force caused by the trailer using a calculated dynamic model of the towing vehicle;
    wherein the dynamic model of the towing vehicle is based on data including at least the movement of the vehicle and the angle of the vehicle;
    generating a compensation signal based on the estimated hitch force; and
    controlling a vehicle system based on the compensation signal.

2. The method of claim 1, wherein the movement of the vehicle comprises a yaw rate.

3. The method of claim 1, wherein the angle of the vehicle comprises at least one of a body slip angle of the vehicle and a steering angle of the vehicle.

4. The method of claim 1, wherein the data further includes at least one of a mass, a longitudinal speed, a moment of inertia around a center point, a cornering stiffness of a front tire, a cornering stiffness of a rear tire, a distance between the front tire and the center point, a second distance between the rear tire and the center point, and a distance between the rear tire and a hitch connecting the towing vehicle to the trailer.

5. The method of claim 1, wherein the movement of the vehicle comprises a sensed movement, and wherein estimating the hitch force caused by the trailer comprises:
    determining a movement estimate; and
    comparing the movement estimate with the sensed movement.

6. The method of claim 1, wherein the angle comprises a sensed angle, and wherein estimating the hitch force caused by the trailer comprises:
    determining an angle estimate; and
    comparing the angle estimate with the sensed angle.

7. The method of claim 1, wherein the estimated hitch force represents a dynamic force applied by the trailer.

8. The method of claim 1, wherein the compensation signal comprises at least one of an engine torque compensating value, a brake torque compensating value, a front steering torque compensating value, and a rear steering torque compensating value.

9. The method of claim 8, wherein the disturbance comprises a hitch force is estimated at a hitch connecting the towing vehicle and the trailer, wherein generating the compensation signal further comprises determining a wheel torque compensating value and a steering angle compensating value from at least one of a first distance between a front tire and a center point, a second distance between a rear tire and the center point, a third distance between the rear tire and the hitch of the towing vehicle, a first cornering stiffness of the front tire, and a second cornering stiffness of the rear tire.

10. The method of claim 1, wherein the compensation signal comprises at least one of a front wheel torque compensation value, a rear wheel torque compensation value, a front wheel steering angle compensation value, and a rear wheel steering angle compensation value.

11. The method of claim 1, further comprising adjusting at least one of a front wheel torque, a rear wheel torque, a front wheel steering angle, and a rear wheel steering angle based on the compensation signal.

12. A system for controlling a towing vehicle adapted to be used with a trailer at a hitch, the system comprising:
    at least one sensor configured to sense vehicle conditions including a movement and a speed of the towing vehicle;
    an estimating module configured to receive the sensed vehicle conditions including the movement of the towing vehicle and the speed of the towing vehicle, and to estimate a hitch force the hitch using a calculated dynamic model of the towing vehicle;
    wherein the dynamic model of the towing vehicle is based on data including the sensed vehicle conditions; and
    a compensation module configured to receive the estimated hitch force from the estimating module, to generate a compensation signal based on the estimated hitch force.

13. The system of claim 12, wherein the movement of the towing vehicle comprises a lateral movement of the towing vehicle.

14. The system of claim 12, wherein the speed of the towing vehicle comprises a wheel speed of the towing vehicle.

15. The system of claim 12, wherein the estimated hitch force represents a dynamic force applied by the trailer.

16. The system of claim 12, wherein the vehicle conditions further include at least one of a steering angle, a mass, a yaw rate, a body slip angle, a moment of inertia around a center point, a cornering stiffness of a front tire, a cornering stiffness of a rear tire, a distance between the front tire and the center point, a second distance between the rear tire and the center point, and a distance between the rear tire and the hitch of the towing vehicle.

17. The system of claim 12, wherein the movement comprises a sensed movement, and wherein the estimating module is further configured to determine a movement estimate, and to compare the movement estimate with the sensed movement.

18. The system of claim 12, wherein the vehicle conditions further comprise a body slip angle of the towing vehicle, and wherein the estimating module is further configured to determine a body slip angle estimate, and to compare the body slip angle estimate with the sensed angle.

19. The system of claim 12, wherein the compensation signal comprises at least one of an engine torque compensating value, a brake torque compensating value, a front steering torque compensating value, and a rear steering torque compensating value.

20. The system of claim 19, wherein the compensation module is further configured to determine a wheel torque and a steering angle from at least one of a first distance between a front tire and a center point, a second distance between a rear tire and the center point, a third distance between the rear tire and the hitch of the towing vehicle, a first cornering stiffness of the front tire and a second cornering stiffness of the rear tire.

21. The system of claim 12, wherein estimating module is further adapted to adjust the hitch force estimate based on a plurality of wheel torques including an engine driving torque and a brake torque.

22. The system of claim 12, wherein the compensation signal comprises at least one of a front wheel torque compensation value, a rear wheel torque compensation value, a front wheel steering angle compensation value, and a rear wheel steering angle compensation value.

23. The system of claim 12, further comprising at least one of a front wheel control configured to adjust a front wheel torque based on the compensation signal, a rear wheel control configured to adjust a rear wheel torque based on the compensation signal, a front wheel steering control configured to adjust a front wheel steering angle based on the compensation signal, and a rear wheel steering control configured to adjust a rear wheel steering angle based on the compensation signal.

24. A method of controlling a towing vehicle adapted to be connected to a trailer, the method comprising:
    generating a dynamic model of the towing vehicle based on a plurality of dynamics of the towing vehicle;
    estimating a hitch force caused by the trailer based on the dynamic model of the towing vehicle; and
    compensating at least one of a wheel torque and a steering angle based on the estimated hitch force.

25. The method of claim 24, wherein the plurality of dynamics of the towing vehicle are modeled with at least of one of a linear model, and a non-linear model.

26. The method of claim 24, wherein the plurality of dynamics of the towing vehicle comprise a wheel speed, a steering angle, a mass, a yaw rate, a body slip angle, a moment of inertia around a center point, a cornering stiffness of a front tire, a cornering stiffness of a rear tire, a distance between the front tire and the center point, a second distance between the rear tire and the center point, and a distance between the rear tire and a hitch connecting the towing vehicle and the trailer.

27. The method of claim 24, wherein estimating the hitch force at the hitch comprises:
    sensing a vehicle condition indicative of a yaw rate of the towing vehicle;
    determining a yaw rate estimate; and
    comparing the yaw rate estimate with the sensed yaw rate.

28. The method of claim 24, wherein estimating the hitch force at the hitch comprises:
    sensing a vehicle condition indicative of a body slip angle of the towing vehicle;
    determining a body slip angle estimate; and
    comparing the body slip angle estimate with the sensed body slip angle.

29. The method of claim 24, wherein the wheel torque comprises at least one of a front wheel torque, and a rear wheel torque.

30. The method of claim 24, wherein the steering angle comprises at least one of a front wheel steering angle, and a rear wheel steering angle.

31. The method of claim 24, wherein compensating at least one of a wheel torque and a steering angle comprises adjusting at least one of the wheel torques with the hitch force at a hitch connecting the towing vehicle and the trailer, and the steering angle with the disturbance at the hitch.

32. A system for controlling a towing vehicle adapted to be connected to a trailer at a hitch, the system comprising:
    means for generating a dynamic model of the towing vehicle based on a plurality of dynamics of the towing vehicle;
    means for estimating a hitch force caused by the vehicle trailer based on the dynamic model of the towing vehicle; and
    means for compensating at least one of an engine torque, a brake torque, and a wheel torque based on the estimated hitch force.

33. The system of claim 32, wherein the means for modeling comprise one of a linear bicycle model, a single-track model, a two-track model, and a non-linear bicycle model.

34. The system of claim 32, wherein the plurality of dynamics of the towing vehicle comprise a wheel speed, a steering angle, a mass, a yaw rate, a body slip angle, a moment of inertia around a center point, a cornering stiffness of a front tire, a cornering stiffness of a rear tire, a distance between the front tire and the center point, a second distance between the rear tire and the center point, and a distance between the rear tire and the hitch.

35. The system of claim 32, wherein means for estimating the hitch force comprises:
    means for sensing a vehicle condition indicative of a yaw rate of the towing vehicle;
    means for determining a yaw rate estimate; and
    means for comparing the yaw rate estimate with the sensed yaw rate.

36. The system of claim 32, wherein means for estimating the hitch force comprises:
    means for sensing a vehicle condition indicative of a body slip angle of the towing vehicle;
    means for determining a body slip angle estimate; and
    means for comparing the body slip angle estimate with the sensed body slip angle.

37. The system of claim 32, further comprising means for finding at least one of a convergence of a yaw rate estimate, a second convergence of a body slip angle, and a convergence of the hitch force estimate.

38. The system of claim 32, wherein the wheel torque comprises at least one of a front wheel torque and a rear wheel torque.

39. The system of claim 32, wherein the steering angle comprises at least one of a front wheel steering angle and a rear wheel steering angle.

* * * * *